(12) United States Patent
Lee

(10) Patent No.: US 7,558,012 B2
(45) Date of Patent: Jul. 7, 2009

(54) READ/WRITE CHANNEL EMBEDDED ON-CHIP OPTIMIZATION

(75) Inventor: Yuan Xing Lee, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 771 days.

(21) Appl. No.: 10/856,568

(22) Filed: May 28, 2004

(65) Prior Publication Data

US 2005/0264910 A1 Dec. 1, 2005

(51) Int. Cl.
*G11B 27/36* (2006.01)

(52) U.S. Cl. ............................. 360/31; 360/39; 360/53; 360/65

(58) Field of Classification Search ................. None
See application file for complete search history.

(56) References Cited

U.S. PATENT DOCUMENTS

| | | | | | |
|---|---|---|---|---|---|
| 4,155,043 | A | * | 5/1979 | Sakamoto | ................. 455/182.1 |
| 5,121,260 | A | * | 6/1992 | Asakawa et al. | ............... 360/31 |
| 5,422,760 | A | * | 6/1995 | Abbott et al. | ................. 360/46 |
| 5,954,837 | A | * | 9/1999 | Kim | ........................... 714/795 |
| 5,970,104 | A | * | 10/1999 | Zhong et al. | ................. 375/341 |
| 6,005,731 | A | * | 12/1999 | Foland et al. | .................. 360/53 |
| 6,101,227 | A | * | 8/2000 | Glover | ........................ 375/341 |
| 6,169,429 | B1 | * | 1/2001 | Kiriaki | ........................ 327/104 |
| 6,201,839 | B1 | * | 3/2001 | Kavcic et al. | ................. 375/341 |
| 6,252,731 | B1 | * | 6/2001 | Sloan et al. | .................... 360/31 |
| 6,449,110 | B1 | * | 9/2002 | DeGroat et al. | ............... 360/46 |
| 6,526,104 | B1 | * | 2/2003 | Hutchins et al. | ............. 375/341 |
| 6,603,722 | B1 | * | 8/2003 | Taguchi et al. | ........... 369/59.21 |
| 6,636,372 | B1 | * | 10/2003 | Nguyen et al. | ................. 360/31 |
| 6,731,443 | B2 | * | 5/2004 | Bliss et al. | ..................... 360/46 |
| 6,735,724 | B1 | * | 5/2004 | McClellan | .................. 714/704 |
| 6,995,933 | B1 | * | 2/2006 | Codilian et al. | ............... 360/46 |
| 7,155,660 | B1 | * | 12/2006 | Burd | .......................... 714/795 |
| 2003/0123364 | A1 | * | 7/2003 | Nakajima et al. | ......... 369/59.22 |
| 2004/0228021 | A1 | * | 11/2004 | Yamazaki | ..................... 360/51 |
| 2006/0023583 | A1 | * | 2/2006 | Annampedu et al. | ........ 369/47.1 |
| 2006/0069945 | A1 | * | 3/2006 | Takashi et al. | ................. 714/5 |

\* cited by examiner

*Primary Examiner*—Hoa T Nguyen
(74) *Attorney, Agent, or Firm*—Townsend and Townsend and Crew LLP; Patrick Duncan

(57) ABSTRACT

Embodiments of the present invention provide optimization of read/write channels in a recording system by embedding channel optimization algorithm/procedure into the channels, or a system-on-chip (SOC) where a read/write channel is integrated with a disk drive controller, according to an Embedded Channel Optimization Solution (ECOS). In one embodiment, the ECOS comprises a setup/restore block configured to set up the read/write channel (separate or embedded in SOC) according to a pattern specified by an input received by the setup/restore block; a parameter/metric block configured to store the parameters to be optimized and a metric for each of the parameters; a metric measurement block configured to provide metric measurements based on the specified pattern; and a sweep compare select block configured to sweep each value of a plurality of values of the parameters, compare a current metric taken from the metric measurement block with a previous metric for each swept value of the parameters to identify a better metric, and select a value of each of the parameters corresponding to the better metric in order to optimize the plurality of parameters.

25 Claims, 10 Drawing Sheets

READ/WRITE CHANNEL EMBEDDED ON-CHIP OPTIMIZATION

CROSS-REFERENCES TO RELATED APPLICATIONS

NOT APPLICABLE

BACKGROUND OF THE INVENTION

This invention relates generally to recording systems and, more particularly, to optimization of read/write channels in a recording system such as a disk drive system.

A read/write channel contains both write and read paths, in which a plurality of functional blocks reside. There are numerous parameters in each functional block. The settings of the parameters affect the performance of the channels such as error rates. For a given recording system, it is desirable to provide a read/write channel that delivers the best performance or lowest error rates (also called the best error rates) to its disk controller for a given recording system. The settings of the parameters corresponding to the best performance are called optimal settings. A recording system includes recording heads for writing and reading, recording media for storing information, and preamplifier and associated inter-connection for bridging electronic signals between read/write channel and recording heads. The optimal settings of channel parameters are typically dependent on the recording system, largely dependent on recording head, media, and preamplifier. Signals from different recording systems have different characteristics which require different optimal settings of channel parameters in order to achieve the optimal performance. For example, in magnetic disk drives, the optimal settings of channel parameters are different from head to head, and from zone to zone. A read/write channel can hardly be useful without optimization (also called tuning) of its key parameters. Optimizing the parameters of channel for a given recording system is important for achieving the best performance of the channel.

The parameters that need to be optimized are channel dependent, and they in general reside in the functional blocks such as pre-compensation, magneto-resistive head asymmetry correction (MR-ASYM), high-pass filter, low-pass-filter, DC-cancellation or compensation loops, finite impulse response equalizer (FIR), channel equalizer target (target), digital post-processor, and automatic gain control loop and timing recovery loop. The truly optimal settings of the parameters should come from the joint optimization of an expression based on all the parameters. In practice, it is difficult to derive such an expression that contains all the parameters of interest. Instead, parameters are optimized individually or jointly to some extent with some specific orders and iterations.

The typical parameters in each functional block are listed as follows: nonlinear transition shift (NLTS), partial erasure, and timing asymmetry in the pre-compensation block; head asymmetry and saturation correction in the magneto-resistive head asymmetry correction block (MR-ASYM) block; high-pass pole cutoff in the high-pass filter block; low-pass cutoff and boost in the low-pass-filter block; loop parameters for the DC-cancellation or compensation block; FIR equalizer taps in the FIR block; target coefficients in the channel target block; taps and thresholds in the digital post-processor block; loop parameters in the automatic gain control loop, and frequency and phase updating parameters in the timing recovery loop block.

The metrics that can be used to optimize channel parameters are channel dependent. In general the metric could be one of the following: error rate (bit error rate, symbol error rate, or sector error rate), mean-square error (MSE), mis-equalization error, non-linear distortion, and Viterbi margins.

Current read/write channels do not utilize any embedded channel optimization schemes. The optimization of channel parameters is done by the use of external software developed by channel users. The external software implements channel optimization algorithms to optimize channel parameters according to a certain metric. The typical metrics available from the channel are MSE and Viterbi margin. If the metric used in optimizing channel is not available from the channel, then external hardware is needed to communicate with the channel to produce the required metric. For example, if the symbol error rate is used as the metric and the channel does not have the means to produce symbol error rates, then an external hardware known as the error rate tester is needed in order to perform channel optimization. When the channel is used in a spinstand environment, there is usually an error rate tester on which external software runs to performance optimization. When the channel is used in a disk drive environment, external software communicates with the disk controller or system-on-chip (SOC) when channels and disk controller are integrated to perform channel optimization. In the case of a hard disk drive, the disk controller is a hard disk controller (HDC).

FIG. 1 shows the block diagrams of software-driven channel optimization interacting with other hardware components. The head/disk 10 sends a read signal through a preamplifier 12 to the read/write channel 14. The channel 14 interfaces with the disk controller or external error rate tester 16 for data writing and reading through a non-return-to-zero (NRZ) bus. The disk controller or external error rate tester 16 communicates via a hardware interface 18 with a computer 20, which utilizes external software 22 for channel optimization. As a result, the read gate is provided to the read/write channel 14 and the write gate is provided to the channel 14 and the preamplifier 12. The read/write channel 14 sends the write data to the preamplifier 12 as the write signal.

FIG. 2 shows the flowchart of a typical algorithm of the software-driven channel optimization. Starting with a list of parameters to optimize 30, if there is parameter on the list that has not been optimized (step 32), the next parameter is fetched (step 34). If there is more value to scan for that parameter (step 36), then via the interface (step 38) the value is changed (step 40). If a writing track is needed (step 42), then via the interface (step 44) a writing track is performed (step 46). Subsequently, sectors are read (step 48), and the results are compared to select the better value (step 50). The next value is scanned and the optimization process is repeated until no more values are left for that parameter. When there are no more parameters left on the list 30, the optimization is completed (step 52).

It is seen from the flowchart that scanning each value of each parameter requires hardware interface access. This is one of the main reasons for the speed limitation of software-driven channel optimization. In software-driven channel optimization, the channel has no knowledge about the optimization algorithm and has to rely on software to initiate the scan of each value of each parameter, thus requiring heavy interface access and limiting speed.

The best performance of the channel is achieved by setting the channel to the optimal settings. The software-driven channel optimization has difficulties in achieving the optimal settings. The level of success of the optimization is largely dependent on how well users understand channels and how users develop optimization algorithms and procedures. Generally, the optimization software is not directly transferable, but is different from application to application. For example, the software that works for external error rate testers is different from the software that works for disk controllers because of the different hardware interface. The software for the disk drive manufacturing application may be different from that for the disk drive integration/development application also due to the different hardware interface. The software-driven channel optimization tends to produce inconsistent performance of channels in different applications. Moreover, the software-driven channel optimization has limited speed for executing optimization algorithms. The speed limit comes from the fact that the execution of every optimization step needs to go through an interface including data writing and reading through the NRZ bus. In the applications where time constraints are imposed such as drive manufacturing applications, it is not practical to optimize all the parameters of interest and scan every value of those parameters in limited time in order to achieve the optimal settings. Because of the speed limit, software-driven optimization usually only optimizes limited parameters and scans limited values for each parameters, resulting in non-optimal settings for channels.

BRIEF SUMMARY OF THE INVENTION

Embodiments of the present invention provide optimization of read/write channels in a recording system by embedding channel optimization algorithm/procedure into the channels according to an Embedded Channel Optimization Solution (ECOS). In cases where channels are integrated with the disk controller which will be called SOC (system-on-chip), the ECOS is part of the SOC. This optimization scheme is used to gain speed and produce consistent optimal settings of parameters in read/write channels. Channels with embedded channel optimization function perform optimization of parameters by themselves, rather than by relying on software developed by channel users, can perform the same optimization independently from applications, and are able to optimize a wider range of parameters of interest within a limited amount of time. Different from software-driven channel optimization, the ECOS is able to scan each value of each parameter of interest without accessing interface and generate write data internally without accessing NRZ bus, thus speeding up the optimization process significantly.

The ECOS resides in read/write channels or SOC when channels and disk controller are integrated. When in SOC, the ECOS can reside in channels only, or in disk controller, or partly in channels and partly in disk controller. ECOS is a special operational mode of the read/write channel or SOC. Once the channel or SOC is in the ECOS mode, it starts optimizing channel parameters according to certain optimization algorithms using certain tuning metrics. ECOS can be configured into one of the two configurations. The first configuration is called Active ECOS (A-ECOS), which optimizes its parameters without needing write and read commands from the disk controller or external error rate testers. The second configuration is called Passive ECOS (P-ECOS), which optimizes its parameters in response to write and read commands from disk controller or external error rate testers. Once the self-tuning is done, ECOS sets the channel with the best settings of parameters.

An aspect of the present invention is directed to a system embedded in a read/write channel, or a system-on-chip which contains a read/write channel and a disk controller integrated together, of a recording apparatus for optimizing a plurality of parameters for the read/write channel. The system comprises a setup/restore block configured to set up the read/write channel or SOC according to a pattern specified by an input received by the setup/restore block; a parameter/metric block configured to store the parameters to be optimized and a metric for each of the parameters; a metric measurement block configured to provide metric measurements based on the specified pattern; and a sweep compare select block configured to sweep each value of a plurality of values of the parameters, compare a current metric taken from the metric measurement block with a previous metric for each swept value of the parameters to identify a better metric, and select a value of each of the parameters corresponding to the better metric in order to optimize the plurality of parameters.

In some embodiments, the parameter/metric block is configured to receive parameters to be optimized from a channel user. An error handling block is configured to detect an error during optimizing of the plurality of parameters. The error handling block is configured to set up exception triggering conditions and actions which should be taken upon detection of exceptions. An error is produced during optimization as a result of any one of a lack of synchronization, off-tracks, defects, and metric overflow, or any other anomalies, or any combination thereof. When the plurality of parameters are write-related, the sweep compare select block is configured, for each value of the parameters to be swept, to receive input of a write track and a read gate prior to sweeping the value.

In specific embodiments, the sweep compare select block is configured to sweep each value of the parameters, compare the metric, and select the value of each of the parameters corresponding to the better metric in order to optimize the plurality of parameters without input from a channel user. The parameters to be optimized are stored in the parameter/metric block without input from a channel user.

In accordance with another aspect of the present invention, a magnetic disk drive apparatus comprises a head-disk assembly; a preamplifier operatively coupled with the head-disk assembly; a read/write channel operatively coupled with the preamplifier; and a control device operatively coupled with the read/write channel to provide input to the read/write channel. The read/write channel has an embedded system for optimizing a plurality of parameters for the read/write channel.

In accordance with another aspect of the present invention, a magnetic disk drive apparatus comprises a head-disk assembly; a preamplifier operatively coupled with the head-disk assembly; a system-on-chip (SOC) operatively coupled with the preamplifier. The SOC includes a read/write channel and a control device. The SOC has an embedded system (ECOS) for optimizing a plurality of parameters for the read/write channel.

In some embodiments, the control device comprises a disk drive controller or an external error rate tester. The control device provides timing information to the read/write channel. The control device may provide input of write and read gates to the read/write channel.

In other embodiments, the control device and read/write channels are integrated into SOC, which includes a disk drive controller or an external error rate tester, and read/write channels. The disk drive controller provides timing information to the read/write channel. The disk drive controller may provide input of write and read gates to the read/write channel.

BRIEF DESCRIPTION OF THE DRAWINGS

FIG. 3 is a block diagram of an actively embedded channel optimization solution (A-ECOS) according to an embodiment of the present invention.

DETAILED DESCRIPTION OF THE INVENTION

The read/write channels in a recording system are optimized by embedding channel optimization algorithm/procedure into the channels or SOC when channels and disk controller are integrated according to an Embedded Channel Optimization Solution (ECOS). ECOS is a special operational mode of the read/write channel or SOC. Once the channel or SOC is in the ECOS mode, it starts optimizing channel parameters according to certain optimization algorithms using certain tuning metrics. ECOS can be configured into either an Active ECOS (A-ECOS) or a Passive ECOS (P-ECOS).

Figure 1:
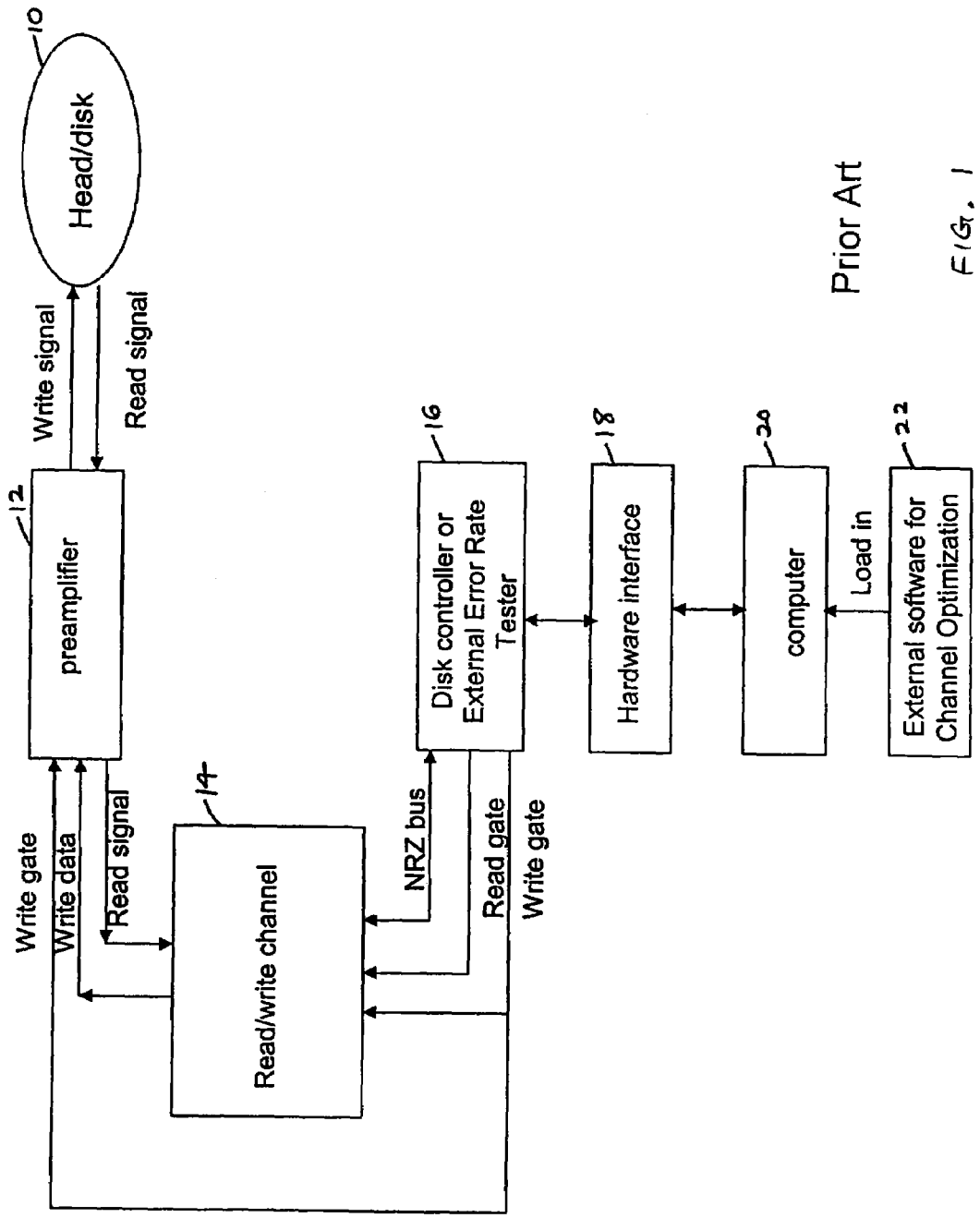
FIG. 1 is a block diagram illustrating channel optimization by the use of external software with the disk controller or external error rate tester.
Figure 2:
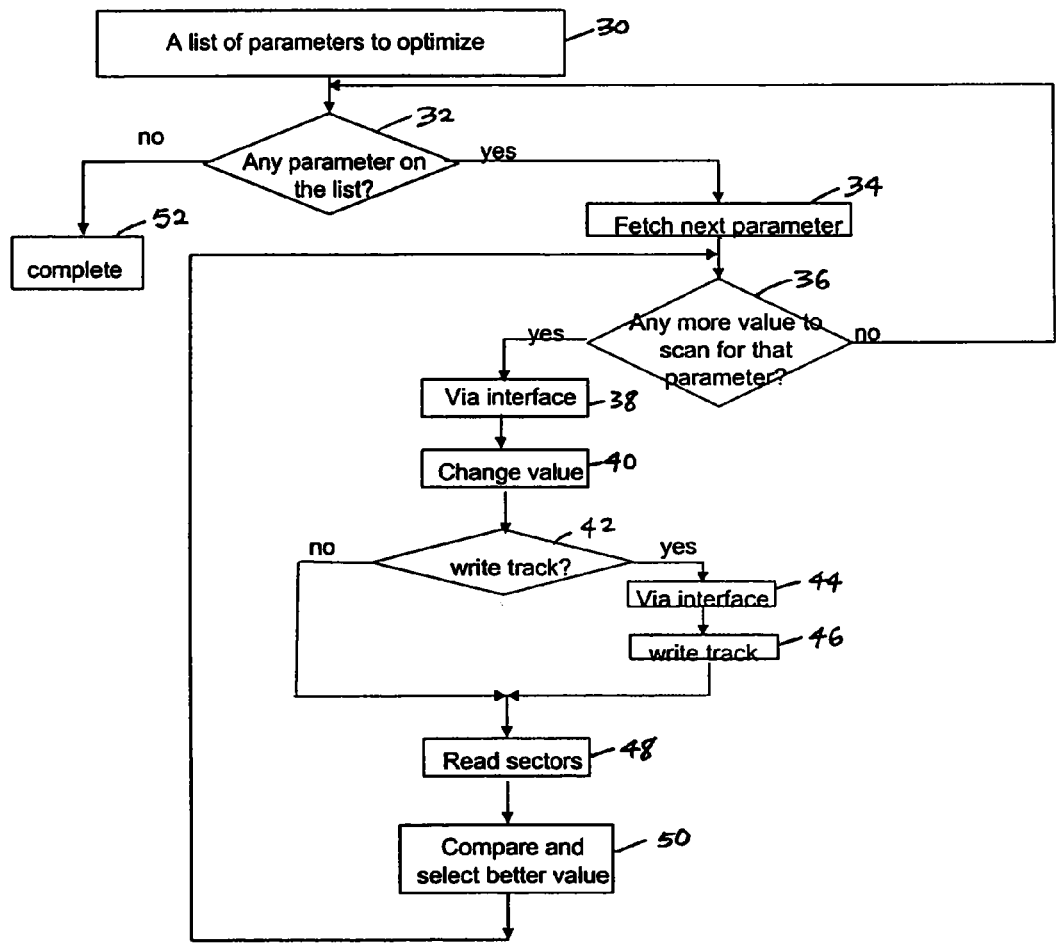
FIG. 2 is a flowchart illustrating channel optimization by the use of external software.
Figure 2:
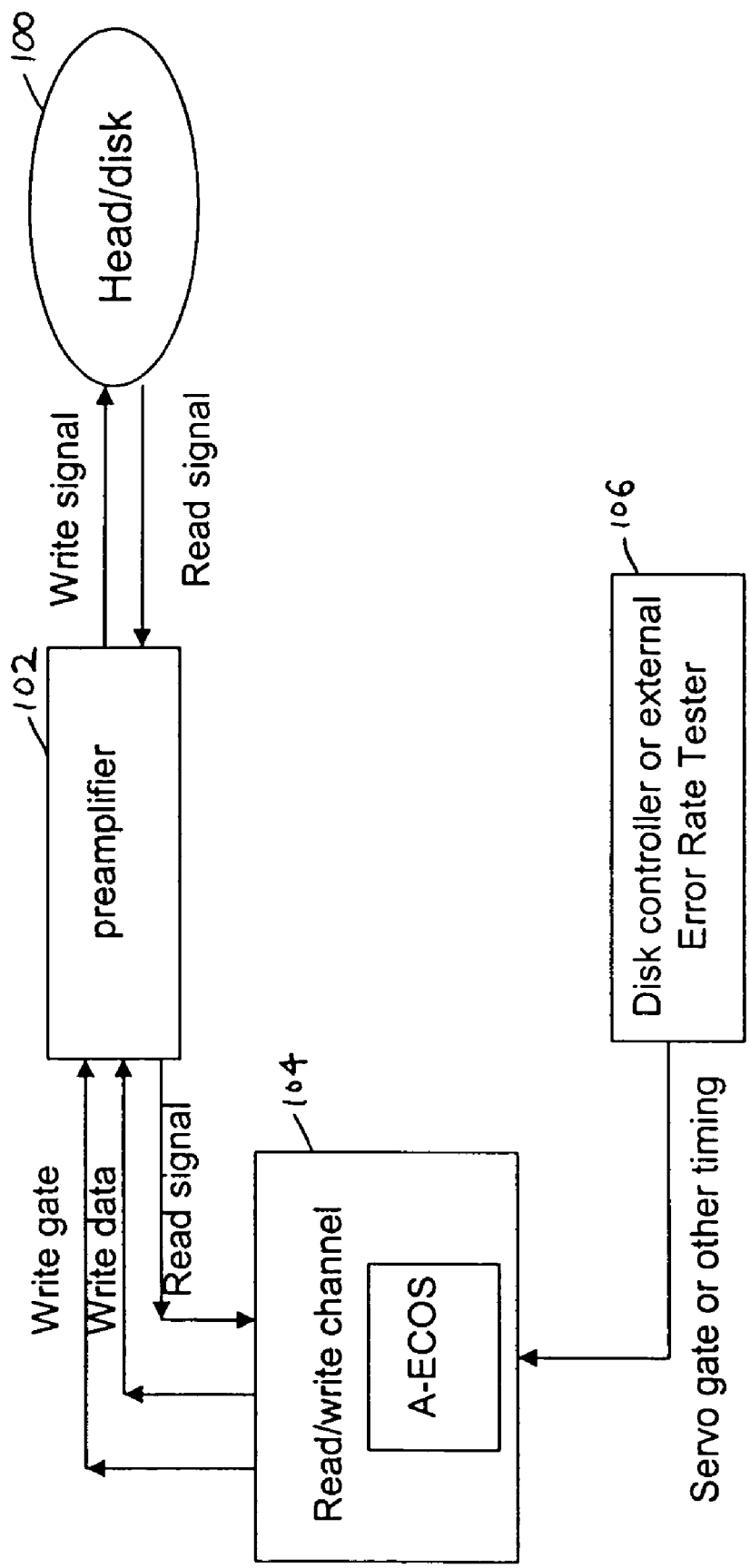
Figure 4:
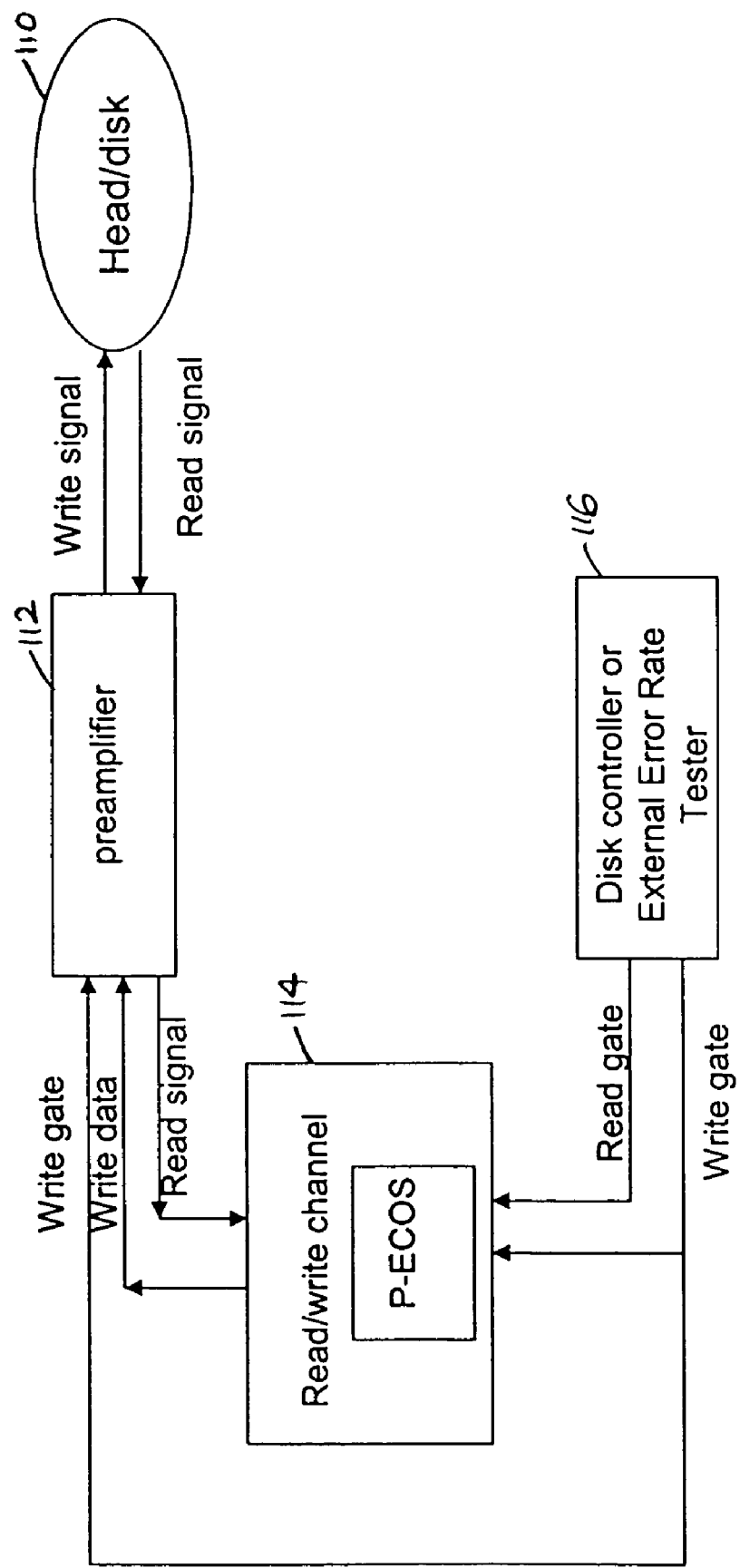
FIG. 4 is a block diagram of a passively embedded channel optimization solution (P-ECOS) according to another embodiment of the present invention.

FIGS. 3 and 4 show the block diagrams of A-ECOS and P-ECOS, respectively. Both A-ECOS and P-ECOS share the same functional blocks. The only difference is on who generates read and write gates. In A-ECOS, both write and read gates are generated inside ECOS, while in P-ECOS, both write and read gates are generated by disk controller or external error rate testers.

As shown in FIG. 3, the head/disk 100 sends a read signal through a preamplifier 102 to the read/write channel 104. The channel 104 includes the A-ECOS, and receives servo gate information or some other timing information from the disk controller or external error rate tester 106. The A-ECOS optimizes its parameters without needing write and read commands from the disk controller or external error rate tester 106. The A-ECOS generates its own write-gate and read-gate timings based on servo gate information or some other timing information from the disk controller or external error rate tester, ignores the non-return-to-zero (NRZ) data bus, and generates its own write data to start self-tuning according to some preferred tuning sequence which could be recommended by the channel designers. The A-ECOS requires very little interactions with the channel users. The channel users just need to perform certain register writing or reading or both operations in order to invoke channel optimization and check certain registers to find out the optimization is completed. As a result, the write gate and write data are provided to the head/disk 100 via the preamplifier 102 as the write signal by the read/write channel 104.

In contrast, the P-ECOS of the read/write channel 114 in FIG. 4 optimizes its parameters in response to write and read commands from the disk controller or external error rate tester 116, after the channel 114 receives the read signal from the head/disk 110 via the preamplifier 112. The P-ECOS requires certain interactions with the disk controller or external error rate tester 116 via the channel users. The P-ECOS does not generate write gate nor read gate. The write and read gates are generated by the disk controller or external error rate tester 116 via the operations of the channel users. The channel users are responsible for issuing write and read commands. As a result, the disk controller or external error rate tester 116 sends the read gate to the read/write channel 114 and the write gate to the channel 114 and the preamplifier 112. The read/write channel 114 provides the write data via the preamplifier 112 to the head/disk 110 as the write signal.

Figure 5:
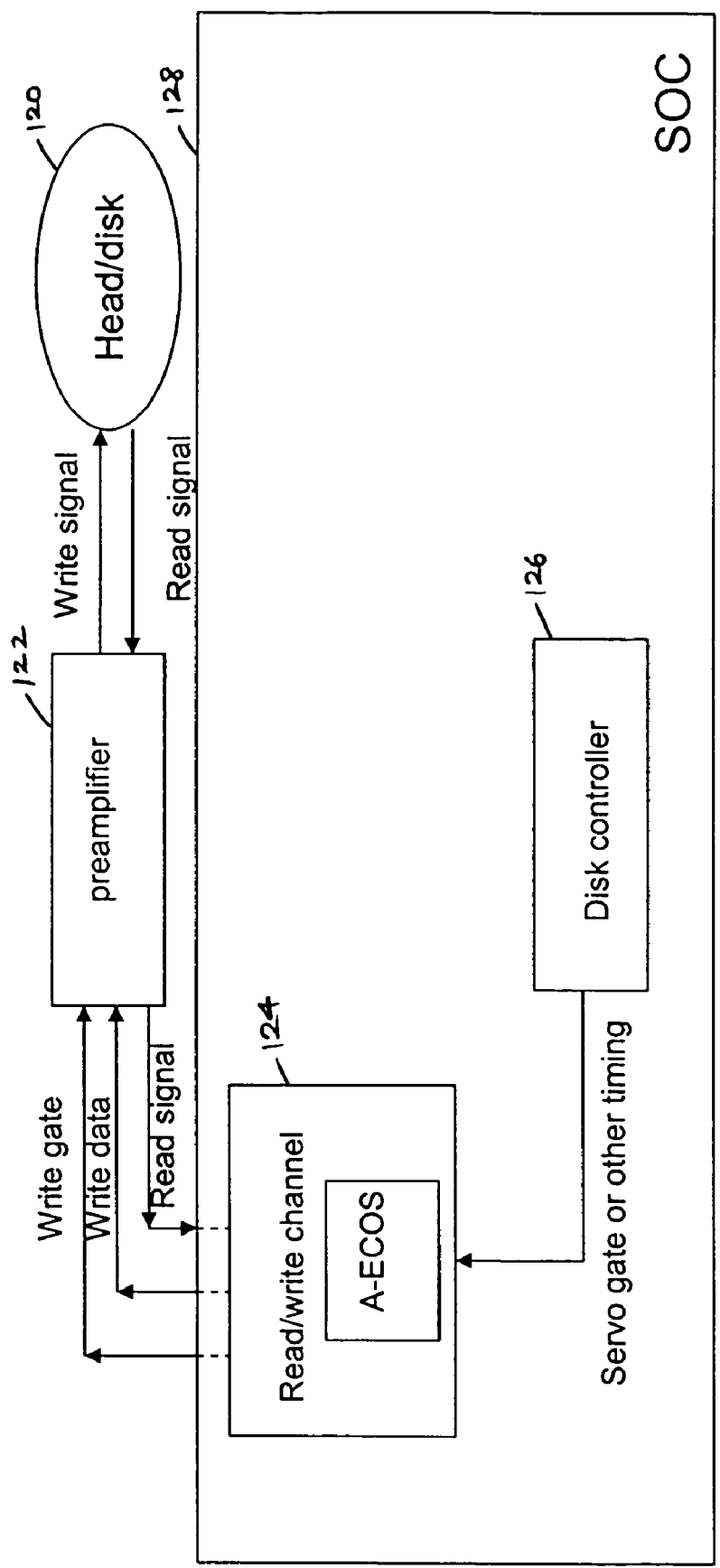
FIG. 5 is a block diagram of an actively embedded channel optimization solution (A-ECOS) in SOC according to another embodiment of the present invention.

As shown in FIG. 5, where the read/write channel 124 and the disk controller 126 are integrated into SOC 128 and the A-ECOS resides in the read/write channel 124, the head/disk 120 sends a read signal through a preamplifier 122 to the read/write channel 124. The channel 124 includes the A-ECOS, and receives servo gate information or some other timing information from the disk controller 126. The A-ECOS optimizes its parameters without needing write and read commands from the disk controller 126. The A-ECOS generates its own write-gate and read-gate timings based on servo gate information or some other timing information from the disk controller 126, and generates its own write data to start self-tuning according to some preferred tuning sequence which could be recommended by the channel designers. The A-ECOS requires very little interactions with the channel users. The channel users just need to perform certain register writing or reading or both operations in order to invoke channel optimization and check certain registers to find out the optimization is completed. As a result, the write gate and write data are provided to the head/disk 120 via the preamplifier 122 as the write signal by the read/write channel 124.

Figure 6:
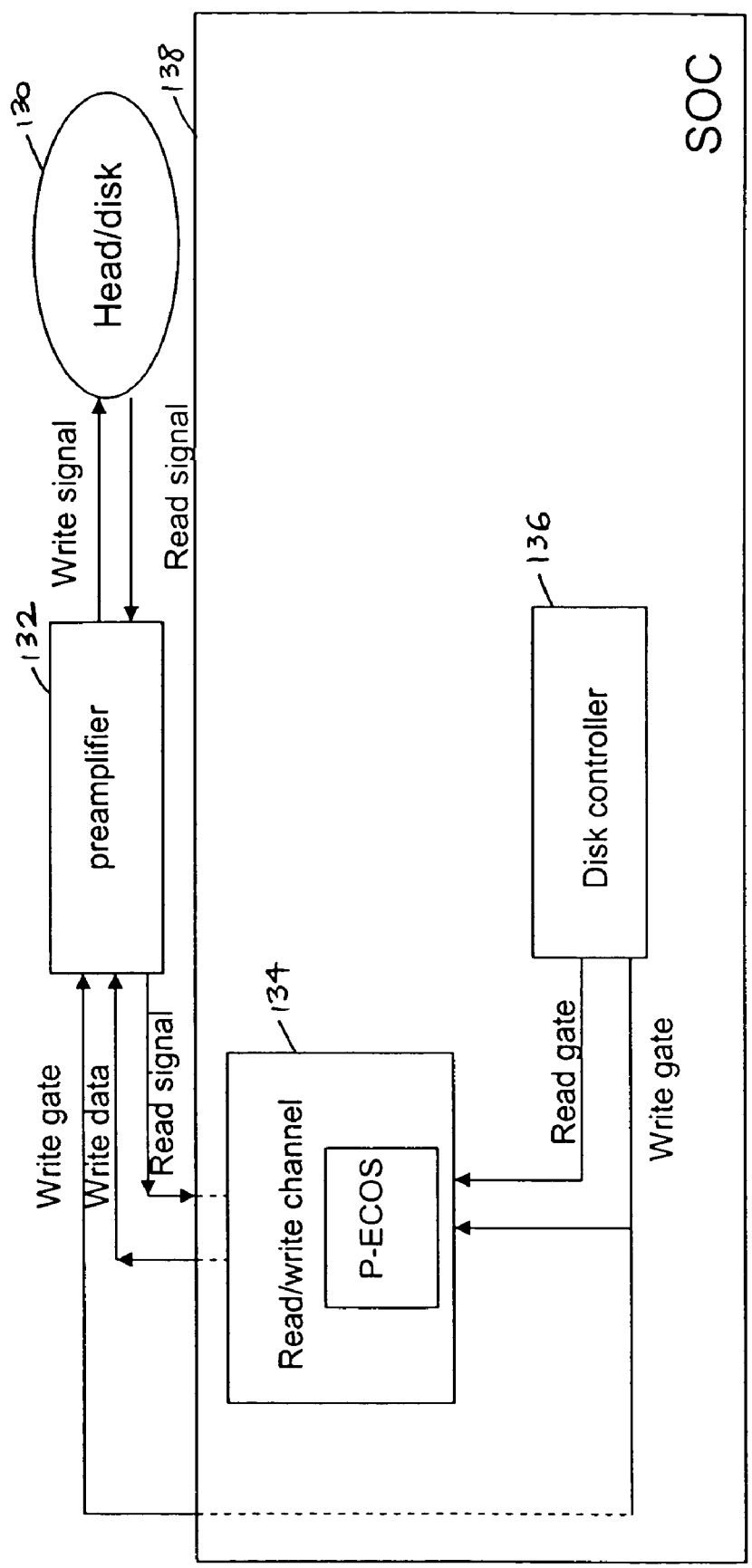
FIG. 6 is a block diagram of a passively embedded channel optimization solution (P-ECOS) residing read/write channel in SOC according to another embodiment of the present invention.

As shown in FIG. 6, where the read/write channel 134 and the disk controller 136 are integrated into SOC 138 and the P-ECOS resides in the read/write channel 134, the P-ECOS in FIG. 6 optimizes its parameters in response to write and read commands from the disk controller 136, after the channel 134 receives the read signal from the head/disk 130 via the preamplifier 132. The P-ECOS requires certain interactions with the disk controller 136 with or without channel users. The P-ECOS does not generate write gate nor read gate. The write and read gates are generated by the disk controller 136 via the operations of disk controller or external error rate tester or channel users. If the disk controller 136 is not responsible for issuing write and read commands, the channel users are then responsible for issuing write and read commands. As a result, the disk controller 136 sends the read gate to the read/write channel 134 and the write gate to the channel 134 and the preamplifier 132. The read/write channel 134 provides the write data via the preamplifier 132 to the head/disk 130 as the write signal.

Figure 7:
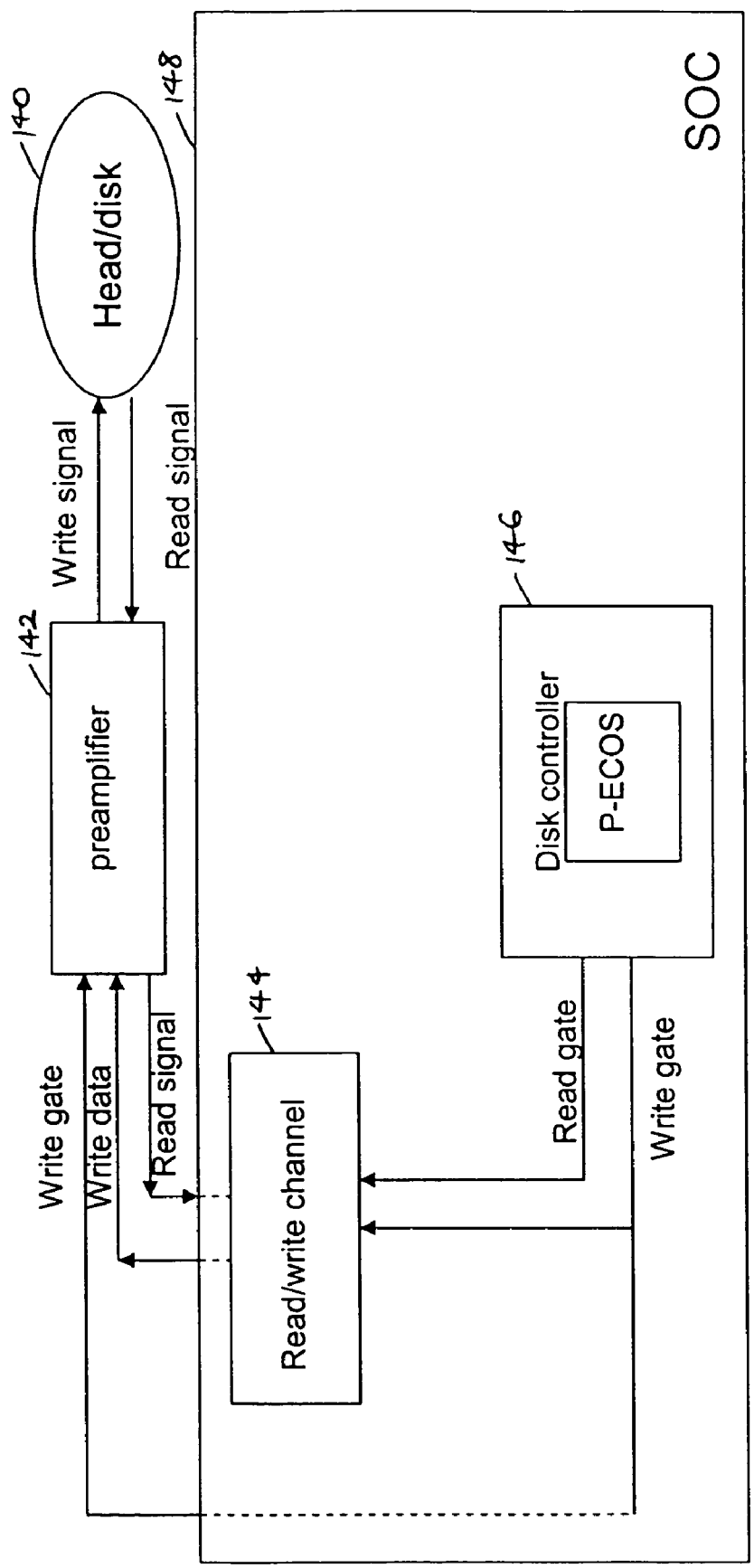
FIG. 7 is a block diagram of a passively embedded channel optimization solution (P-ECOS) residing in disk controller in SOC according to another embodiment of the present invention.

As shown in FIG. 7, where the read/write channel 144 and the disk controller 146 are integrated into SOC 148 and the P-ECOS resides in the disk controller 148, the P-ECOS in FIG. 7 optimizes its parameters in response to write and read commands from the disk controller 146, after the channel 144 receives the read signal from the head/disk 140 via the preamplifier 142. The P-ECOS requires certain interactions with the disk controller 146 with or without channel users. The P-ECOS does not generate write gate nor read gate. The write and read gates are generated by the disk controller 146 via the operations of disk controller 146 or channel users. If the disk controller 146 is not responsible for issuing write and read commands, the channel users are then responsible for issuing write and read commands. As a result, the disk controller 146 sends the read gate to the read/write channel 144 and the write gate to the channel 144 and the preamplifier 142. The read/write channel 144 provides the write data via the preamplifier 142 to the head/disk 140 as the write signal.

Once the self-tuning is done, the ECOS sets the channel with the "best" settings of the parameters as a result of the self-tuning. While there are several tuning metrics that can be used, the symbol error rate metric is one preferred metric since it is important to channel performance. Of course, the present invention is not limited to any specific tuning metrics.

Figure 8:
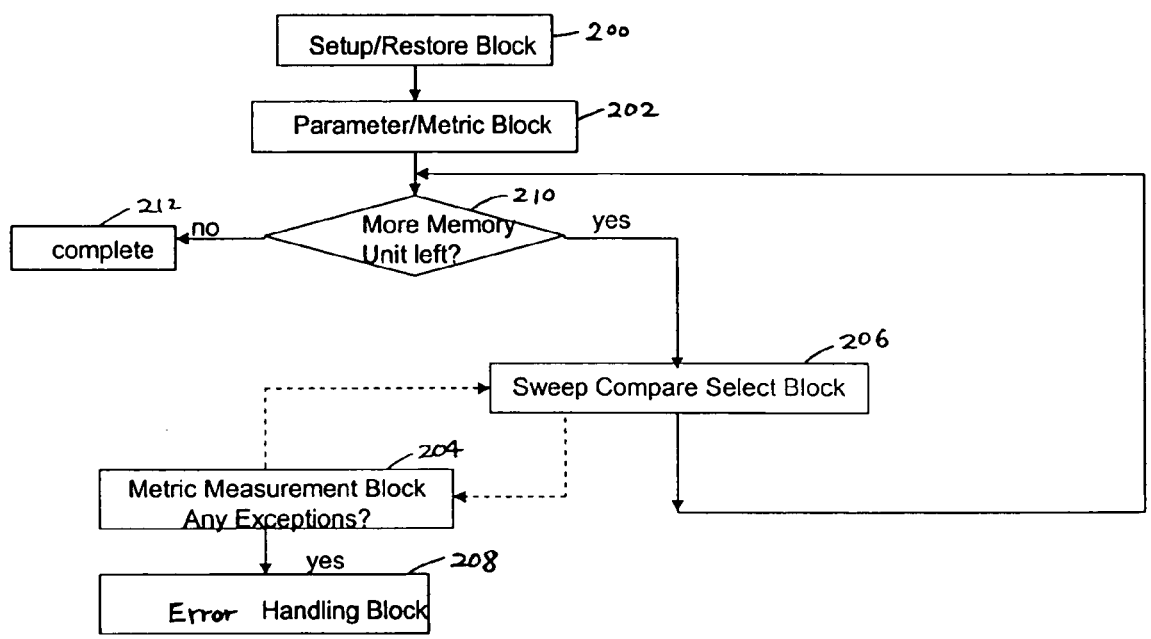
FIG. 8 is a block diagram illustrating how the functional blocks interact with each other in the embedded channel optimization solution (ECOS) according to an embodiment of the present invention.

In the specific embodiment shown in FIG. 8, the functional blocks for the A-ECOS and the P-ECOS are the Setup/Restore Block 200, Parameter/Metric List Block 202, Metric Measurement Block 204, Sweep Compare Select Block 206, and Error Handling Block 208.

The Setup/Restore Block 200 sets up the channel or SOC according to which pattern the user selects. If the user selects all ones, all zeros, or some other pattern, then the Setup/Restore Block 200 needs to do nothing. However, if the user selects the pseudo-random binary sequence (PRBS) pattern, then the Setup/Restore Block 200 needs to disable the post processor, select the regular detector, and disable the encoder/decoder. When optimization is completed, the ECOS restores the settings stored in the Setup/Restore Block 200 for the PRBS pattern case. The channel randomizer should be turned on by the Setup/Restore Block 200 before proceeding to the next block.

The Parameter/Metric List Block 202 has a memory including N units, where N represents the number of primary parameters of interest to be optimized including multiple iterations. Since some parameters may be interrelated for optimization, each memory unit allows up to M secondary parameters to be scanned simultaneously with the primary parameters. Both N and M are channel dependent, and are recommended by channel designers. Each memory unit includes the addresses of the N primary and M secondary parameters, the minimum (Min) and maximum (Max) values of the each of the parameters, metric and step size for each of the parameters, and 1-bit information for each of the parameters to indicate if the parameter is write-related. In general, all the parameters of interest can be categorized into two groups: write-related and non-write-related. The write-related parameters require write operation before read operation, while non-write-related parameters only require read operation. Write-related parameters are usually related to the channel pre-compensation block. The majority of the parameters of interest are non-write-related. The ECOS executes channel optimization in order according to the parameters listed in the Parameter/Metric List Block 202. For the case of N=1, the ECOS optimizes only one primary parameter at a time. The Parameter/Metric List Block 202 can be pre-loaded by the designers, or can be loaded in by the channel users. The channel users can repeatedly write into this block one primary parameter at a time, causing the channel to optimize parameters step by step. For example, in the P-ECOS, the channel users can write write-related parameters such as parameters in the pre-compensation block into the Parameter/Metric List Block 202 one at a time to cause the P-ECOS to optimize the write-related parameter one at a time, and then write multiple non-write related parameters into the Parameter/Metric List Block 202 to cause the P-ECOS to optimize all the non-write related parameters automatically.

The Metric Measurement Block 204 does metric measurements such as symbol error rate measurements on pre-defined patterns such as all ones pattern, all zeros pattern, PRBS pattern, or any patterns that can be reproduced by the channels. Repetitive patterns are preferred, and randomizer should be turned on. The users have choices of patterns to be used in metric measurements. The users can select patterns by writing to a certain registers. The Metric Measurement Block 204 also stores measurement stopping conditions such as the number of sectors read, or the number of symbols read, or the number of errors accumulated before stopping the Metric Measurement Block 204. Whenever the stopping condition is true, the Metric Measurement Block 204 stops reading, its metric is fed to the Sweep Compare Select Block 206, and then the metric is reset. The operation of the Metric Measurement Block 204 is always initiated by Sweep Compare Select Block 206.

The Sweep Compare Select Block 206 takes parameters from each memory unit of the Parameter/Metric List Block 202 sequentially, sweeps or scans each value of the primary parameters and that of the secondary parameters simultaneously, compares the metric for each scanned value of the parameters taken from the Metric Measurement Block 204, and selects the values of the parameters corresponding to a better metric. Once the entire values of the parameters specified by Min and Max are exhausted, the values selected by the Sweep Compare Select Block 206 are the optimal values for the parameters specified in the current memory unit. If no secondary parameters are present, then a single primary parameter is scanned. A register is used to keep track of the memory units that have been swept. The Sweep Compare Select Block 206 loops itself until each of the memory units of the Parameter/Metric List Block 202 is exhausted.

The Error Handling Block 208 is a special block which handles exceptions or abnormities during the course of optimization by the ECOS. The exceptions usually happen in the Metric Measurement Block 204. The common exceptions are channel producing burst of errors caused by events such as mis-sync detection, losing timing, defects, off-tracks, overflow of the Metric Measurement Block 204, and the like. Upon the detection of any of these exceptions by the Error Handling Block 208, some special action will be taken by this block in order to avoid putting the channel in bad settings. The special action could be one of following:

1. Termination of the ECOS and calling the Setup/Restore Block 200 to restore the channel original settings; or
2. Termination of the ECOS and keeping the optimal settings for the parameters scanned just before the detection of the exceptions; or
3. Skipping the scanning of the current memory unit, keeping the best settings so far and moving onto the next memory unit, if any; or
4. Loading back in the original settings for the current memory unit and re-starting the scanning of the current memory unit.

FIG. 8 shows a flowchart on how each of the functional blocks interacts with each others. The ECOS has to be configured before it can function correctly. The register settings of the configuration of the ECOS can be part of the default register settings for the channel. Thus, every channel user will have the same ECOS configuration. Alternatively, the channel users can re-configure the ECOS differently. Below are the configurations for each of the functional blocks:

1. Configure the Setup/Restore Block 200
   a. Select a pattern. It could be all ones, or all zeros, or some other repetitive pattern, or a non repetitive pattern.
   b. If the pattern is the PRBS pattern, disable the parity post-processor, select the regular detector, and disable the encoder/decoder.
2. Configure the Parameter/Metric Block 202
   a. Set Up the N Memory Unit
      i. Each memory unit includes the followings:
         (1) the address of each of the N primary and M secondary parameters;
         (2) the minimum (Min) and maximum (Max) value of the each of the parameters;
         (3) the metric and step size for each of the parameters; and
         (4) the 1-bit information for each of the parameters to indicate if the parameter is write-related.
3. Configure the Sweep Compare Select Block 206
   a. Clear the memory for storing surviving value for each parameter to be scanned.
   b. Reset the original metric.
   c. Call Steps a and b every time when scanning a new memory unit in the Parameter/Metric Block 202.
   d. When functioning, this Block takes information from the Parameter/Metric List Block 202, sweeps through each value of the parameters using the specified step sizes, compare the current metric taken from Metric Measurement Block 204 with the previous metric, and select the values of parameters corresponding to better metric. The process goes on until all the values specified in Min and Max are exhausted.
   e. A register is reserved to keep track of the memory units that have been swept by the Sweep Compare Select Block 206. Probing the value in this register reveals the progress of the ECOS and if the ECOS operation has completed.
4. Configure the Metric Measurement Block 204
   a. Set Up the Stopping Conditions
      i. Set up the number of sectors read; or number of symbol read; or number of errors accumulated.
      ii. Clear the metric.
   b. Set Up the Internal Read Operation Window
      i. Reference this read operation window to the synchronization byte found.
      ii. Specify how many data symbols to read during each read gate assertion period once the synchronization byte is found.
   c. The Metric Measurement Block 204 stops whenever the stopping conditions are met.
   d. The Metric Measurement Block 204 calls the Error Handling Block 208 if any exceptions are detected.
5. Configure the Error Handling Block 208
   a. Set Up the Exception Triggering Conditions
      i. Synchronization is not found;
      ii. Synchronization is mis-detected;
      iii. Long string of burst errors;
      iv. Off-tracks;
      v. Metric overflow; and
      vi. Any other anomalies.
   b. Set Up what Actions Should be Taken Upon Detection of the Exceptions.

Figure 9:
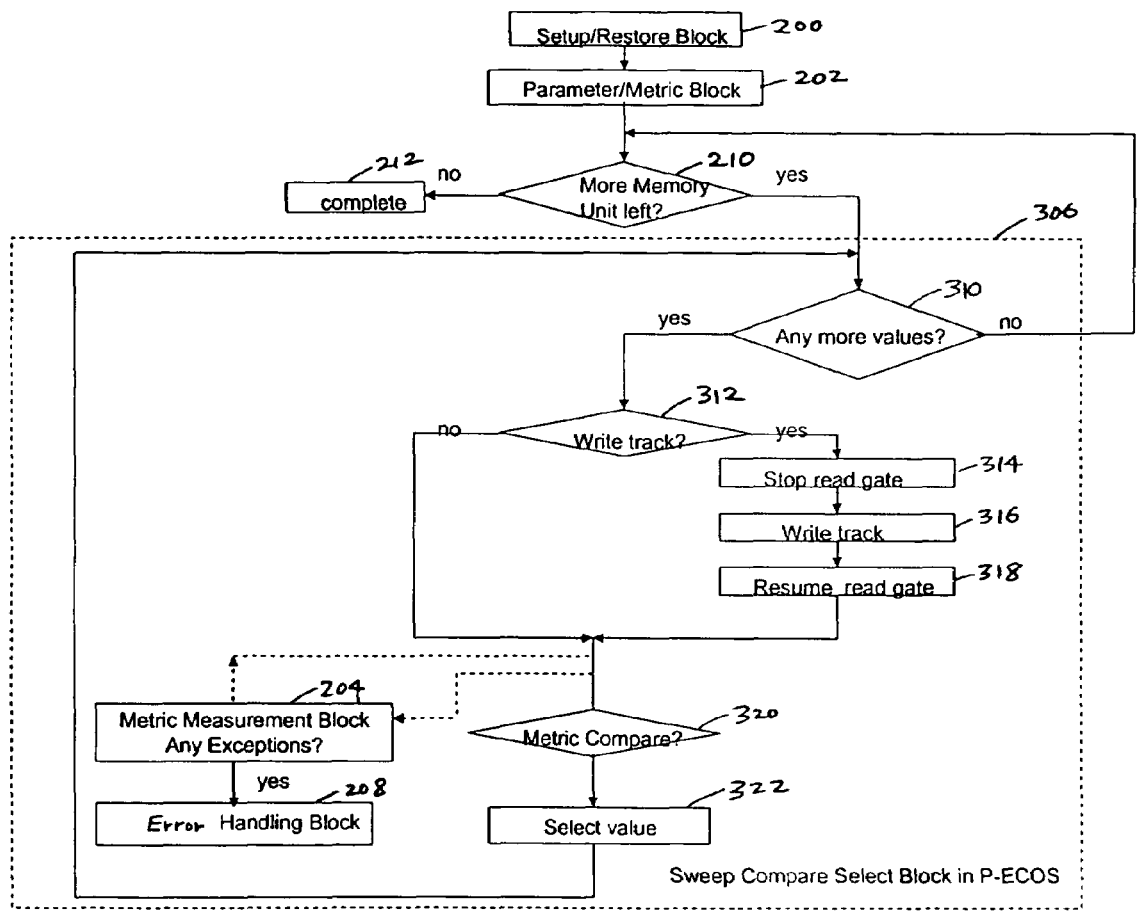
FIG. 9 is a flowchart of the sweep compare select block in the P-ECOS according to another embodiment of the present invention.

With the flowchart and configurations of the ECOS as provided above, the algorithm for the ECOS according to an exemplary embodiment of the invention can be stated as follows:

1. Configure the ECOS if needed.
2. Write a test track. For the A-ECOS, writing a test track is done by the ECOS, and read gate is asserted. For the P-ECOS, the users assert a write gate to write a test track and then assert a read gate. If P-ECOS resides in SOC, disk controller may perform writing a test track and asserting a read gate without a need for the involvement of users.
3. The users write to a certain register to cause the ECOS to execute.
4. If there is no more memory unit in the Parameter/Metric List Block 202 that has not been swept, optimization is completed (212 in FIG. 8) and the ECOS writes to a certain register to indicate the completion of the process; otherwise proceed to step 5 below (see step 210 in FIG. 8);
5. Fetch all information from the next memory unit in the Parameter/Metric List Block 202 into the Sweep Compare Select Block 206. The Sweep Compare Select Block sweeps each value of the primary parameter in the specified step size if there is only one parameter in memory unit, or sweeps each value of the primary and secondary parameters simultaneously in the respective specified step size. For each value to be swept, it calls the Metric Measurement Block 204 to measure metric. The Metric Measurement Block 204 measures the metric until the stopping condition is true and reports the metric back to the Sweep Compare Select Block 206. The Sweep Compare Select Block 206 compares the returned metric with the previous metric and stores the values of parameters corresponding to better metric. The Sweep Compare Select Block 206 loops itself until all the values specified in Min and Max are exhausted. Once the memory unit is swept, the Sweep Compare Select Block 206 updates some designated register to indicate the completion of the current memory unit and goes to Step 4 above (see step 210 in FIG. 8). If any exceptions are encountered in Metric Measurement Block 204, the Error Handling Block 208 starts working and appropriate actions are taken to complete the ECOS process. For the A-ECOS, or P-ECOS in SOC and SOC responsible for issuing writing/reading commands, the execution of Step 5 does not require any user interaction. However for the P-ECOS not residing in SOC and P-ECOS residing in SOC but SOC not in charge of issuing writing/reading gates, if parameters are write-related, then some user interaction is needed, as shown in FIG. 9. The steps performed by the Sweep Compare Select Block 306 in the P-ECOS are illustrated. In this case, for every value of parameters (step 310), a writing track is needed (step 312). The Sweep Compare Select Block 306 waits for the users to write a test track since it knows the parameters are write-related; the users will write a test track and assert a read gate. The users write to a certain register to indicate it is ready for the Sweep Compare Select Block 306 to start the scanning operation. Once scanning of the current value is done, the Sweep Compare Select Block 306 writes to a certain register to indicate the completion of the scanning of the value, and the users and Sweep Compare Select Block 306 repeat this process until the completion of scanning all the values of the parameters in the memory unit. As shown in FIG. 9, the Sweep Compare Select Block 306 stops the read gate (step 314), writes the track (step 316), and then resumes the read gate (318). The metrics are compared (step 320) to select the better value (step 322).

Both the A-ECOS and P-ECOS can be implemented into modern read/write channels or SOC with limited complexity. The advantages are enormous and will make read/write channels much more intelligent. For example, this optimization scheme is used to gain speed and produce consistent optimal settings of parameters in read/write channels. Channels with embedded channel optimization function perform optimization of parameters by themselves, rather than by relying on software developed by channel users, can perform the same optimization independently from applications, and are able to optimize a wider range of parameters of interest within a limited amount of time. Different from software-driven channel optimization, the ECOS is able to scan each value of each parameter of interest without accessing interface and generate write data internally without accessing the NRZ bus, thus speeding up the optimization process significantly.

Figure 10:
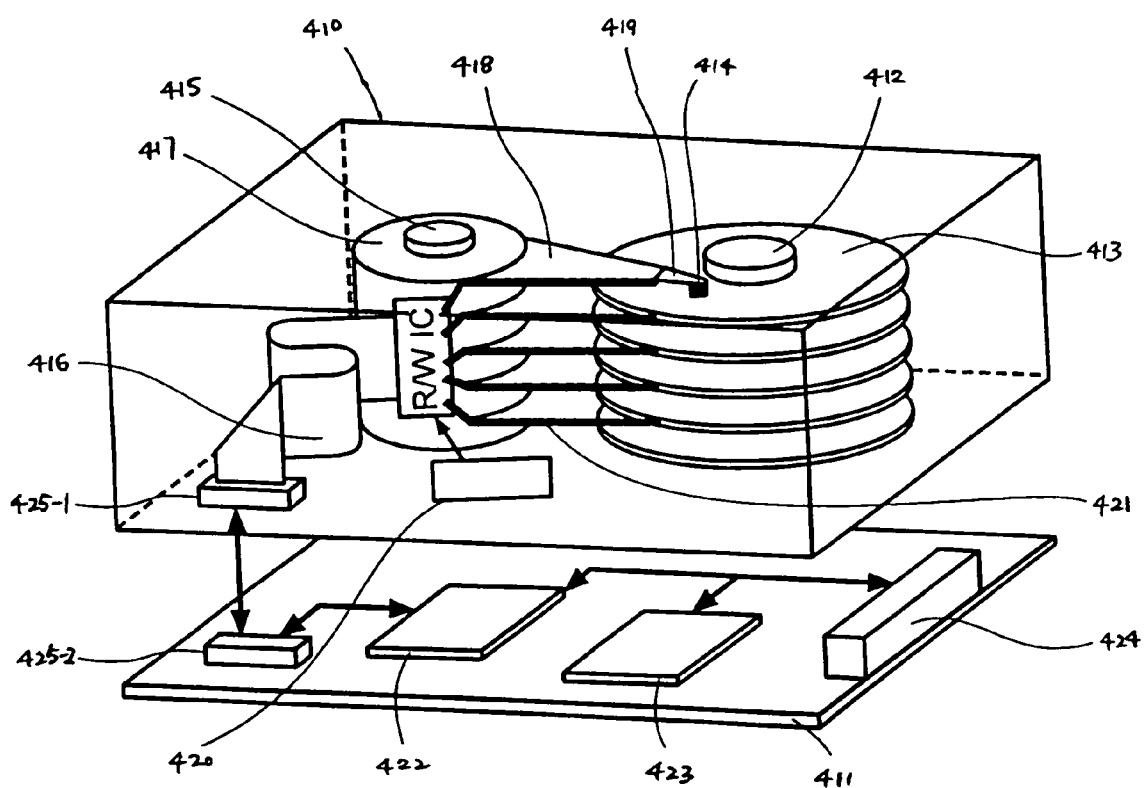
FIG. 10 is a diagram of a magnetic disk drive according to one embodiment of the present invention.

The ECOS may be implemented in a magnetic disk drive of FIG. 10 according to one embodiment of the present invention. The magnetic disk drive includes a head-disk assembly (HDA) 410 and a writing-reading control circuit 411. The HDA 410 includes a spindle unit 412 to which are attached magnetic recording media 413 in layers, and a carriage unit 415 on which are mounted magnetic heads 414 to write and read information to and from the magnetic recording media 413. They are enclosed in an aluminum base and covering. The carriage unit 415 includes a voice coil motor (VCM) 417 which moves the magnetic heads 414 for seeking and positioning over the magnetic recording media 413, arms 418, suspensions 419 attached respectively to the forward ends of the arms 418, magnetic heads 414 attached respectively to the forward ends of the suspensions 419, a flexible patterned cable (FPC) 416, preamplifiers 420 in the R/W IC mounted on the FPC 416, and transmission lines 421 to transmit writing and reading signals between the preamplifiers 420 and the magnetic heads 414. The HDA 410 is connected to the external unit through the writing-reading control circuit 411 (which may be placed inside the HDA 410). In the writing-reading control circuit 411 are mounted a read/write channel 422 having the ECOS and a hard disk drive (HDD) controller 423. The read/write channels 422 and HDD 423 may be integrated in SOC. The preamplifiers 420 is connected to the read/write channel 422 through a connector 425-1 (for the HDA 410) and a connector 425-2 (for the writing-reading control circuit 411) which are joined together. The writing-reading control circuit 411 is connected to an external unit through its external interface 424.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A system embedded in a read/write channel, or a system-on-chip which contains a read/write channel and a disk controller integrated together, of a recording apparatus for optimizing a plurality of parameters for the read/write channel, the system comprising:
   a setup/restore block configured to
      set up the read/write channel to generate a data pattern specified by a control input received by the setup/restore block; and
      write the data pattern to a recording medium of the recording apparatus;
   a parameter/metric block configured to store the parameters to be optimized and a metric for each of the parameters;
   a metric measurement block configured to provide metric measurements based on the specified pattern; and
   a sweep compare select block configured to sweep each value of a plurality of values of the parameters, compare a current metric taken from the metric measurement block with a previous metric for each swept value of the parameters to identify a better metric, and select a value of each of the parameters corresponding to the better metric in order to optimize the plurality of parameters.

2. The system of claim 1 wherein the setup/restore block is configured to setup the read/write channel according to one of a pattern of all zeros, a pattern of all ones, and a pseudo-random binary sequence pattern.

3. The system of claim 1 wherein the parameter/metric block is configured to store, for each of the parameters, a minimum value and a maximum value for the parameter, a step size for varying the value of the parameter, and information indicating if the parameter is write-related.

4. The system of claim 1 wherein the metric measurement block is configured to store a measurement stopping condition, and wherein the metric measurement block is configured to stop metric measurement and send the measured metric to the sweep compare select block when the measurement stopping condition is met.

5. The system of claim 1 wherein the plurality of parameters comprise primary and secondary parameters, and wherein the sweep compare select block is configured to sweep each value of the primary and secondary parameters simultaneously.

6. The system of claim 1 wherein the plurality of parameters comprise primary and secondary parameters, and wherein the parameter/metric block is configured to store addresses of the primary and secondary parameters.

7. The system of claim 1 wherein the metric for the parameters is one of a symbol error rate, bit error rate, a sector failure rate or sector re-try rate, a mean-square error, a mis-equalization error, a non-linear distortion, and Viterbi margins.

8. The system of claim 1 wherein the parameter/metric block is configured to receive parameters to be optimized from a channel user.

9. The system of claim 1 further comprises an error handling block which is configured to detect an error during optimizing of the plurality of parameters.

10. The system of claim 9 wherein an error is produced by the read/write channel as a result of any one of a lack of synchronization, off-tracks, defects, and metric overflow.

11. A system embedded in a read/write channel, or a system-on-chip which contains a read/write channel and a disk controller integrated together, of a recording apparatus for optimizing a plurality of parameters for the read/write channel, the system comprising:
   a setup/restore block configured to set up the read/write channel according to a data pattern specified by a control input received by the setup/restore block;
   a parameter/metric block configured to store the parameters to be optimized and a metric for each of the parameters;
   a metric measurement block configured to provide metric measurements based on the specified pattern; and
   a sweep compare select block configured to sweep each value of a plurality of values of the parameters, compare a current metric taken from the metric measurement block with a previous metric for each swept value of the parameters to identify a better metric, and select a value of each of the parameters corresponding to the better metric in order to optimize the plurality of parameters, wherein at least a portion of the plurality of parameters are used by the read/write channel during a write operation, wherein the sweep compare select block is configured, for each value of the parameters to be swept, to receive input of a write track and a read gate prior to sweeping the value.

12. The system of claim 1 wherein the sweep compare select block is configured to sweep each value of the parameters, compare the metric, and select the value of each of the parameters corresponding to the better metric in order to optimize the plurality of parameters without input from a channel user.

13. A magnetic disk drive apparatus comprising:
a head-disk assembly;
a preamplifier operatively coupled with the head-disk assembly;
a read/write channel operatively coupled with the preamplifier;
a control device operatively coupled with the read/write channel to provide input to the read/write channel, wherein the read/write channel has an embedded system for optimizing a plurality of parameters for the read/write channel;
a metric measurement block configured to provide metric measurements based on the specified pattern; and
a parameter/metric block configured to store the parameters to be optimized and a metric for each of the parameters, wherein the parameter/metric block is configured to store, for each of the parameters, a minimum value and a maximum value for the parameter, a step size for varying the value of the parameter, and information indicating if the parameter is write-related.

14. The magnetic disk drive apparatus of claim 13 wherein the control device comprises a disk drive controller or an external error rate tester.

15. The magnetic disk drive apparatus of claim 13 wherein the control device provides timing information to the read/write channel.

16. The magnetic disk drive apparatus of claim 13 wherein the control device provides input of write and read gates to the read/write channel.

17. The magnetic disk drive apparatus of claim 13 wherein the embedded system comprises:
a setup/restore block configured to set up the read/write channel according to a pattern specified by an input received by the setup/restore block; and
a sweep compare select block configured to sweep each value of a plurality of values of the parameters, compare a current metric taken from the metric measurement block with a previous metric for each swept value of the parameters to identify a better metric, and select a value of each of the parameters corresponding to the better metric in order to optimize the plurality of parameters.

18. The magnetic disk drive apparatus of claim 13 wherein the parameters to be optimized are stored in the parameter/metric block without input from a channel user.

19. The magnetic disk drive apparatus of claim 17 wherein the embedded system further comprises an error handling block which is configured to detect an error during optimizing of the plurality of parameters.

20. The magnetic disk drive apparatus of claim 17 wherein the sweep compare select block is configured to sweep each value of the parameters, compare the metric, and select the value of each of the parameters corresponding to the better metric in order to optimize the plurality of parameters without input from a channel user.

21. The magnetic disk drive apparatus of claim 13 wherein the control device and the read/write channel are integrated on a system-on-chip.

22. A magnetic disk drive apparatus comprising:
a head-disk assembly;
a preamplifier operatively coupled with the head-disk assembly; and
a system-on-chip including a read/write channel operatively coupled with the preamplifier and a control device operatively coupled with the read/write channel to provide input to the read/write channel,
wherein the system-on-chip has an embedded system for optimizing a plurality of parameters for the read/write channel,
wherein the embedded system is configured to sweep each value of a plurality of values of the parameters, compare a current metric taken from the metric measurement block with a previous metric for each swept value of the parameters to identify a better metric, and select a value of each of the parameters corresponding to the better metric in order to optimize the plurality of parameters, wherein the plurality of parameters comprise primary and secondary parameters, and wherein the sweep compare select block is configured to sweep each value of the primary and secondary parameters simultaneously.

23. The magnetic disk drive apparatus of claim 22 wherein the embedded system is embedded in the read/write channel of the system-on-chip.

24. The magnetic disk drive apparatus of claim 22 wherein the embedded system is embedded in the control device of the system-on-chip.

25. The magnetic disk drive apparatus of claim 22 wherein the embedded system is embedded partly in the read/write channel and partly in the control device of the system-on-chip.

* * * * *